United States Patent
Warner et al.

(10) Patent No.: US 6,289,015 B1
(45) Date of Patent: Sep. 11, 2001

(54) METHOD AND APPARATUS FOR THE SECURE SWITCHING OF A PACKET WITHIN A COMMUNICATIONS NETWORK

(75) Inventors: Thomas E. Warner, Moraga; Patrick L. Corder, Martinez; Mark S. Miller, Oakland; Steven L. Ethier, Pleasanton, all of CA (US)

(73) Assignee: Tut Systems, Inc., Pleasant Hill, CA (US)

(*) Notice: Subject to any disclaimer, the term of this patent is extended or adjusted under 35 U.S.C. 154(b) by 0 days.

(21) Appl. No.: 09/156,570

(22) Filed: Sep. 17, 1998

(51) Int. Cl.[7] .................................................. H04L 12/28
(52) U.S. Cl. ............................ 370/392; 370/352; 370/389
(58) Field of Search .................................... 370/351, 389, 370/396, 398, 400, 422, 535, 537, 902, 352

(56) References Cited

U.S. PATENT DOCUMENTS 5,689,644 * 11/1997 Cou et al. ............................. 370/392
6,009,092 * 12/1999 Basilico ............................... 370/352
6,084,878 *  7/2000 Crayford et al. ..................... 370/389

OTHER PUBLICATIONS

"TNETX–15AE Address–Lookup Device", Texas Instruments Datasheets, pp1–78, SPWS041A, Aug. 1997, revised Oct. 1997.

"TNETX3100—ThunderSwitch™ 10–Port 10–/100–MBIT/S Ethernet™ Switch", Texas Instruments Datasheets, pp 1–79, SPWS031D, Jun. 1997, revised Oct. 1997.

"TNETX3150/TNETX3150A ThunderSwitch™ 15–Port 10–/100–MBIT/S Ethernet™ Switch", Texas Instruments Database, pp 1–112, SPWS027F, Feb. 1997, revised Sep. 1997.

* cited by examiner

Primary Examiner—Douglas Olms
Assistant Examiner—Indes Pal Mehra
(74) Attorney, Agent, or Firm—Blakely, Sokoloff, Taylor & Zafman

(57) ABSTRACT

A switch for switching a packet within a communications network includes a switching core that services a number of ports. The switch also includes address matching logic, coupled to the switching core, that implements an address lookup scheme according to which the switching core may switch to packet received at the switch. Override logic, that is also coupled to the switching core, determines with a packet received at any one of the number of ports serviced by the switching core is received at a predetermined port. This may be done by snooping a bus within the switch that provides an indication of an active port. If the packet was not received at the predetermined port, the override logic override the address matching logic to cause the switching core to route the packet exclusively to the first port.

42 Claims, 6 Drawing Sheets

METHOD AND APPARATUS FOR THE SECURE SWITCHING OF A PACKET WITHIN A COMMUNICATIONS NETWORK

FIELD OF THE INVENTION

The present invention relates generally to the field of network communications and, more specifically, to the secure switching of a packet through a switch that may have Local Area Networks (LANs) coupled to various ports of the switch.

BACKGROUND OF THE INVENTION

In a typical network environment, a switch may be utilized to facilitate communications between various segments of a single network in an intelligent and accordingly efficient manner. Specifically, a switch may in time learn the network addresses of the various network devices on segments coupled to the respective ports of the switch. By examining each packet received at the switch, the switch is then able to make a determination as to whether the received packet should be propagated out of a particular port, and over a particular segment, based on the address information associated with the received packet.

As a switch is typically deployed within a single network (e.g., the network of a single organization) which is secured from unauthorized, outside access, there is no need to provide robust security between ports of the switch Specifically, the various segments of the single network that are serviced by the switch are typically utilized to facilitate communications between network devices of a single organization.

SUMMARY OF THE INVENTION

According to the invention, there is provided switching apparatus for switching a packet within a communications network. The switching apparatus includes a switch core servicing a plurality of ports. Address matching logic, coupled to the switching core, implements an address look-up scheme according to which the switching core may switch a packet. Override logic, coupled to the switching core, determines whether a packet received at any one of the plurality of ports was received at a first port. If not, the override logic overrides the address matching logic to cause the switching core to route the packet exclusively to the first port.

Other features of the present invention will be apparent from the accompanying drawings and from the detailed description that follows.

BRIEF DESCRIPTION OF THE DRAWINGS

The present invention is illustrated by way of example, and not imitation, in the figures of the accompanying drawings in which like references indicate similar elements.

DETAILED DESCRIPTION

A method and apparatus for the secure switching of a packet within a communications network are described. In the following description, for the purposes of explanation, numerous specific details are set forth to provide a thorough understanding of the present invention. It will be evident, however, to one skill in the art that the present invention may be practiced without these specific details.

Figure 1:
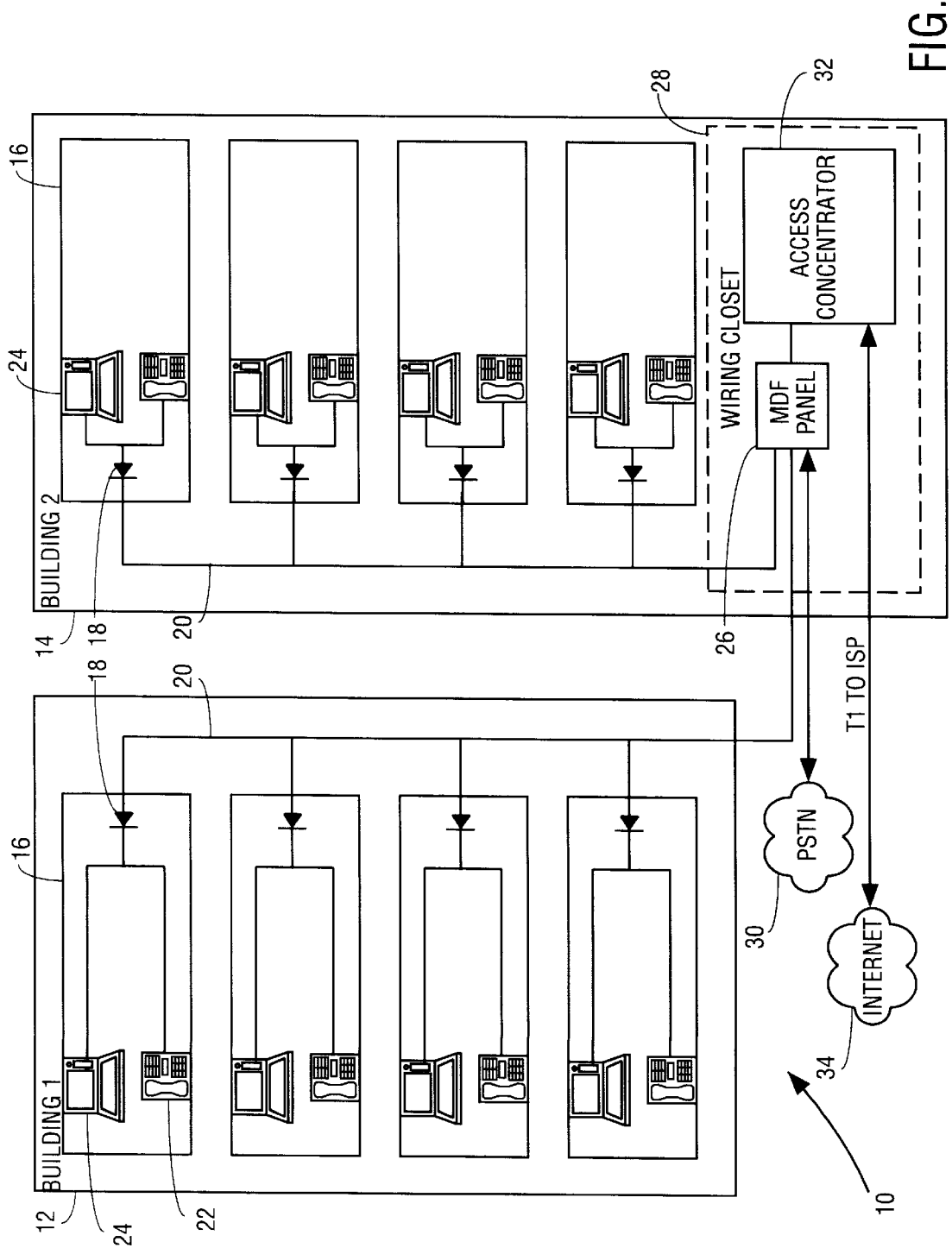
FIG. 1 is a diagrammatic representation of a multi-dwelling unit (MDU) within which the present invention may be employed.

FIG. 1 is a diagrammatic representation of a multi-dwelling unit (MDU) 10 within which the present invention may be employed. The MDU 10 is shown to include two buildings 12 and 14, and each of the buildings 12 and 14 is shown to include a number of units 16, which may be apartments, hotel rooms, offices, or booths. The units 16 may be located on multiple floors within each of the buildings 12 and 14. The MDU 10 may be a high-rise apartment complex, garden-style apartment complex, hotel, or any other structure that includes discrete residential accommodations. The present invention may also be employed within office complexes, factories, exhibit halls or any other environment within which two or more devices may require networking.

Each unit 16 is shown to include a network connection, in the exemplary form of an RJ-11 socket 18, that is coupled to a carrier medium, in the exemplary form of Plain Old Telephone Service (POTS) wiring 20. The wiring 20 may comprise multiple Unshielded Twisted Pair (UTP) wire pairs utilized to establish a telephone connection network throughout the buildings 12 or 14. In this case, the wiring 20 may be Category 1 or Category 2 wiring, as defined by the EIA/TIA 568 specification. Within each unit 16, a regular telephone unit 22 and a computer 24 (via Network Interface Card (NIC), specialized "modem" or other form of adapter) are shown to be coupled to the wiring 20 via a respective RJ-11 socket 18. The wiring 20 within each of the buildings 12 and 14 is shown to be coupled to a Main Distribution Frame (MDF) panel 26, within a wiring closet 28 of the building 14. The MDF panel 26 couples the wiring 20 to the Public Switched Telephone Network (PSTN) 30. The MDF panel 26 is also shown to be coupled to an access concentrator 32, which is constructed according to the teachings of the present invention, to provide access to the Internet 34 to devices coupled to the wiring 20, such as the illustrated computers 24. While the present invention is described below within the context of a network implemented utilizing POTS wiring 20 as a carrier medium, it will readily be appreciated that the teachings of the present invention may be implemented within any network environment within which switching occurs, such as a network utilizing a carrier medium that supports higher transmission rates, such as for example Category 5 cabling in the form of four-wire twisted-pair cable that can transmit data at 100 Mbps to support technologies such as Ethernet or Asynchronous Transfer Mode (ATM).

Figure 2:
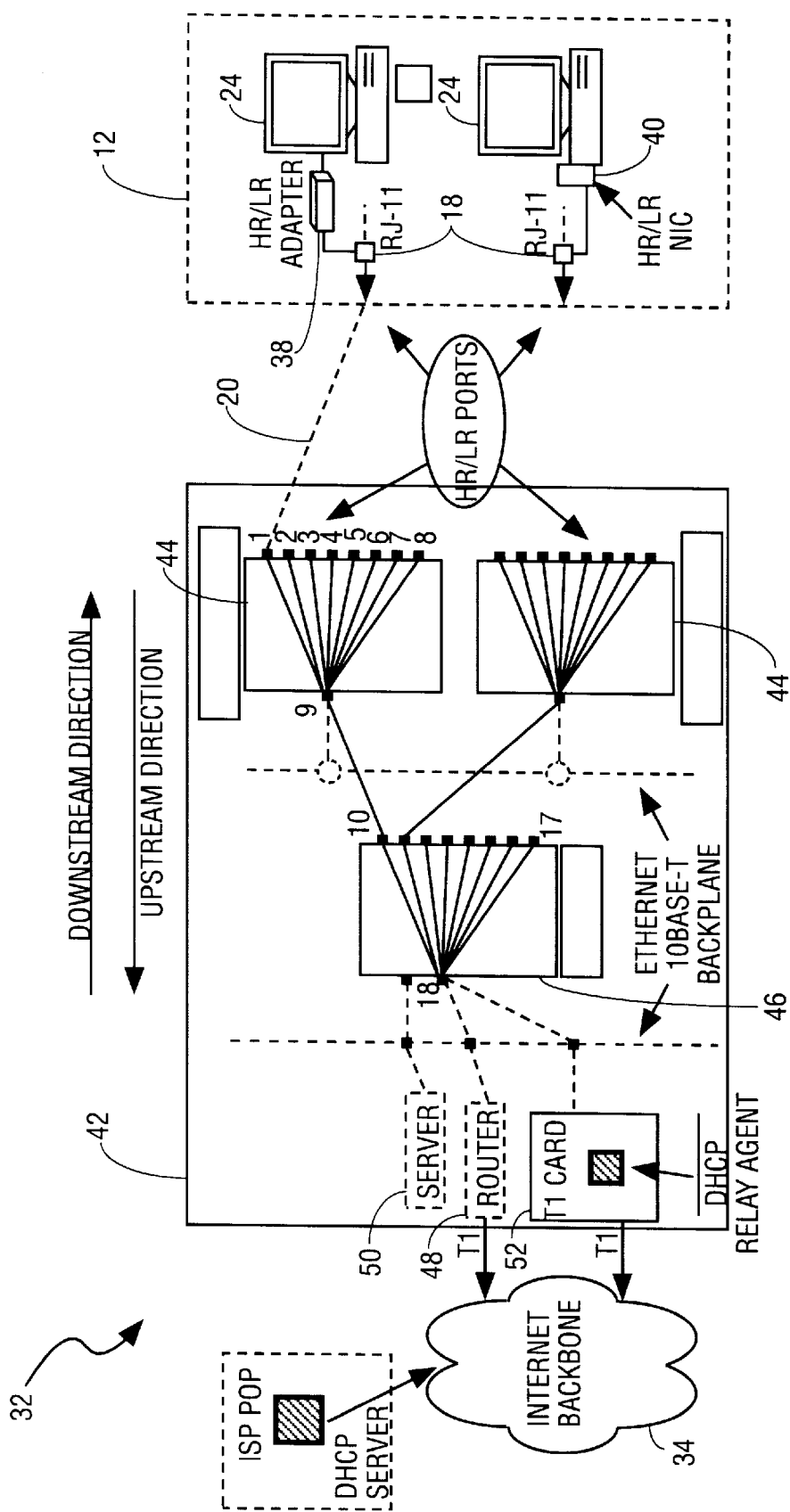
FIG. 2 is a diagrammatic representation of an access concentrator, according to an exemplary embodiment of the present invention.

FIG. 2 is a diagrammatic representation of the access concentrator 32, illustrating further details regarding the construction of this unit. A first computer 24 within the building 12 is shown to be coupled via an external adapter 38 to a respective RJ-11 socket, the adapter 38 including a physical layer device (PHY) that enables reliable network communication over the POTS wiring 20. A second computer 24 is shown to include an internal Network Interface Card (NIC) 40 that similarly includes a PHY for facilitating communication over the POTS wiring 20. Turning specifically to the access concentrator 32, a chassis or shelf 42 accommodates a series of line cards 44 that are coupled to a multiplexer (MUX) card 46. The chassis 42 includes 17 slots into which line cards 44 may be inserted. In one basic configuration, a collection of eight line cards 44 are coupled to a single MUX card 46 by a 10BaseT connection. The MUX card 46 may concentrate up to sixty-four (64) 1 Mbps LANs coupled to respective ports of the line cards 44 into an aggregate 10 Mbps or 100 Mbps LAN. The aggregate LAN may be connected to a local router 48, Local server 50, or to a Wide Area Network (WAN) via a T1 WAN card 52.

Figure 3:
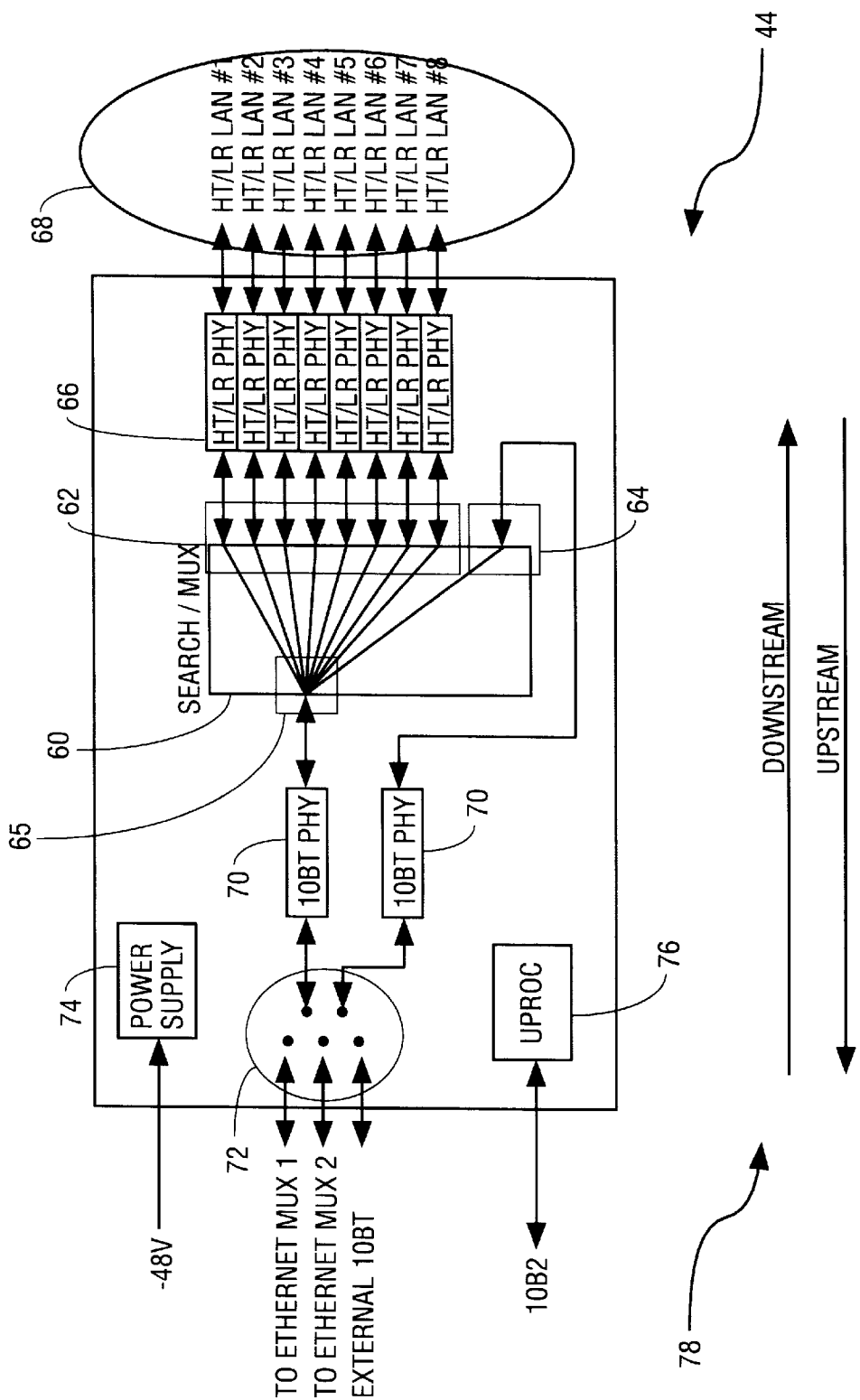
FIG. 3 is a block diagram showing structural details of a line card, according to an exemplary embodiment of the present invention.

FIG. 3 is a block diagram illustrating further structural details of a line card 44, according to an exemplary embodiment of the present invention. The line card 44 includes a switch 60, which may be an Ethernet switch based on a Texas Instruments TNETX3100 switch. The switch 60 may provide eight 10 Mbps ports and two 10/100 Mbps ports.

The switch 60 further has individual General Purpose Serial Interface (GPSI) interfaces for each port that allows each port to interface with a physical layer device (PHY) 66. Eight of the ports 62 are shown to be coupled via PHYs 66 to respective LANs 68. In one embodiment, a LAN 68 may be implemented in each of the units 16 illustrated in FIG. 1 utilizing the POTS wiring 20. In this case, the twisted-pair from each of the units 16 will be coupled to a respective PHY 66. Two of the ports 64 and 65 are shown to be coupled to respective 10BaseT physical layer devices 70. Conveniently, the ports 62 and 64 may be labeled "downstream" ports, and the port 65 labeled an "upstream" port. The ports 64 allow the line card 44 to be daisy chained to further line cards 44, while the port 65 is regarded as an "output" port. As illustrated at 72, the ports 64 and 65 may be coupled to a further line card, a MUX card, or to an external 10BaseT port. The line card 44 is also shown to include a power supply 74 and a microprocessor 76.

In a MDU 10, such as that illustrated in FIG. 1, the users on the LANs 68 (coupled to each of the ports 62 of the switch 60) are typically individual users with no affiliation to users coupled to the other LANs 68. This may create security issues, in that a user on a LAN may conceivably be able to snoop network traffic transmitted from and to a user on another LAN 68 coupled to the switch 60. Further, it is conceivable that a user on a first LAN 68 would be able to set up a web server, that could be accessed by users of the other LANs, without access in an Internet Service Provider (ISP). This may be undesirable in certain situations.

For data security purposes, it is desirable that a user coupled to any one of the LANs 68 not see traffic transmitted to and from users connected to other LANs 68. Further, data transmissions should be secured in both directions (i.e., the upstream and the downstream directions indicated by the arrows at 78). To this end, and as applied to upstream traffic, the present invention teaches a method and apparatus whereby the line card 44, and specifically the switch 60, may operate as a multiplexer in a first mode to ensure that packets received on any one of the ports 62 are forwarded only to the upstream (or output) port 65, and not to any of the other ports 62. In a second mode, the switch 60 operates in a conventional manner to forward packets utilizing conventional address-lookup forwarding techniques. In the downstream direction, any unicast packet received from the port 65, and for which a forwarding address has not been learned on any of the downstream ports 62, is furthermore dropped.

Figure 4:
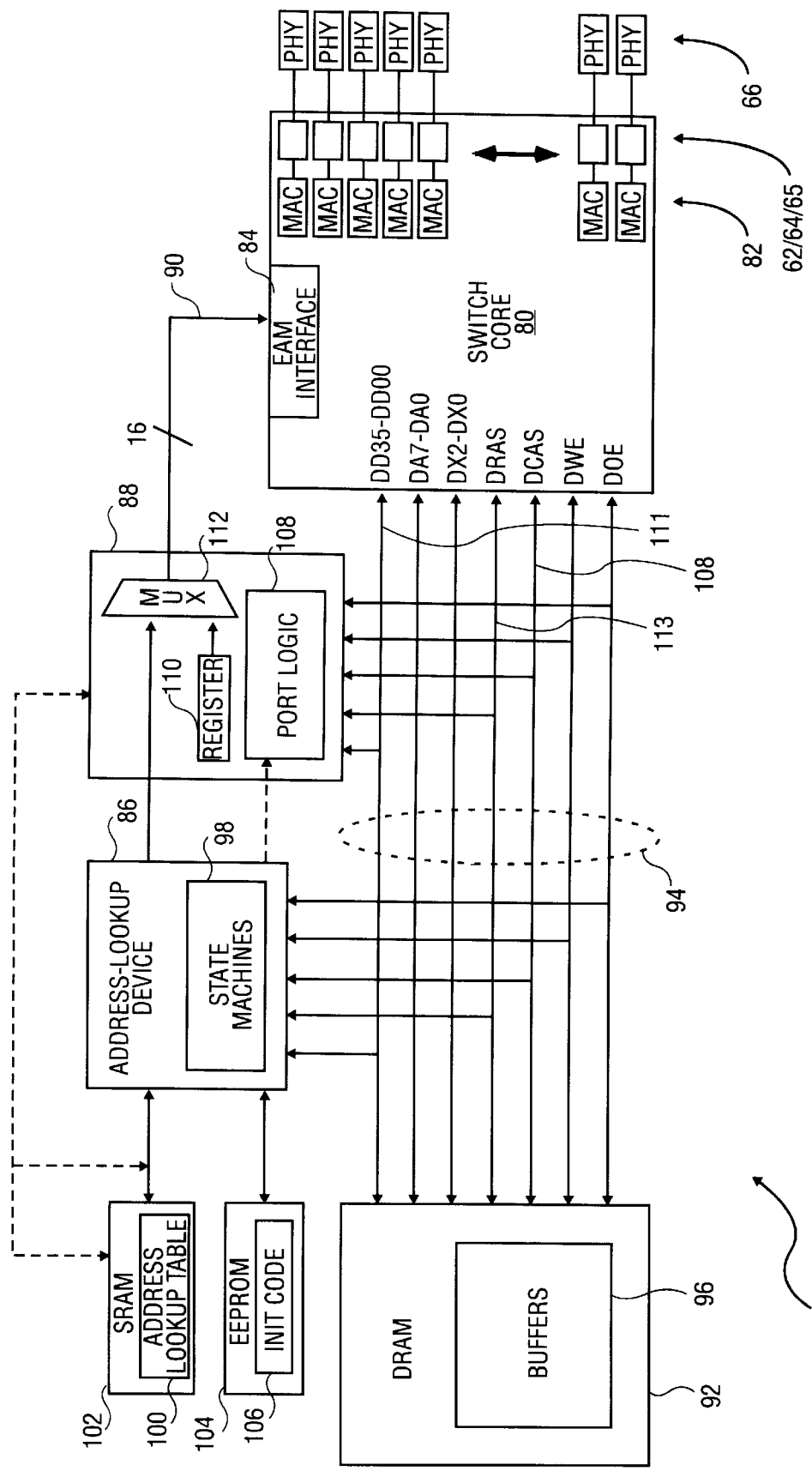
FIG. 4 is a block diagram illustrating a switch, according to an exemplary embodiment of the present invention.

FIG. 4 is a block diagram illustrating an exemplary implementation of the switch 60, shown in FIG. 3. A switch core 80 (a.k.a. a switching fabric) is shown to include the ports 62 and 64, an array of corresponding Media Access Control (MAC) ports 82 and an External Address Match (EAM) interface 84. An external physical layer device (PHY) 66 is coupled to each port. Each of the PHYs 66 may be a 10 BaseT PHY, or a specialized PHY to facilitate communications over the POTS wiring 20. In one exemplary embodiment, such a specialized PHY may comprise the HomeRun PHY, developed by Tut Systems, Inc. of Pleasant Hill, Calif. The switch core 80 also includes a data path, switching logic, internal single-address compare, and network statistics logic (all not shown).

The switch core 80 may support both cut-through routing, that enables transmission on a destination port before complete reception of a packet, and store-and-forward routing, that requires that the entire packet be received before it is propagated to a destination port. Cut-throughout routing reduces overall switch latency, while store-and-forward routing provides the ability to filter frames that contain errors.

Three packet-forwarding modes are also implemented by the switch core 80, namely an internal single-address compare mode, an external address match (EAM) mode and a frame-taking mode. The EAM interface 84 facilitates the support of multiple addresses per port, as opposed to the single-address mode compare that only supports a single address per port. Accordingly, to support multiple users on a LAN 68 coupled to each port 62/64/65, switching logic in the form of an address-lookup device 86, and override circuitry 88 provide an input, in the form of a port-indicating (EAM) signal 90 to the EAM interface 84 of the switch core 80. The EAM signal 90 is a multiple-bit signal (e.g., a 16 bit signal (EAM [0 . . . 15])) that indicates to the switch core 80 to which ports a packet should be forwarded (or routed) within the switch. The EAM signal 90 may also indicate whether the switch core 80 is to implement the single-address compare. For example, EAM [15] may be either set or reset to select between the single-address compare or the external address match modes. In the event that EAM [15] is reset (i.e., low), the external address match mode is implemented, and EAM [0 . . . 14] represents a mask of the ports to which the packet is forwarded. For example, if the packet if is to be forwarded to ports 00,07 and 14, the EAM signal 90 would be "1000000010000001".

A memory resource in the form of a Dynamic Random Access Memory (DRAM) 92 is coupled to the switch core 80 by a DRAM bus 94. The DRAM 92 implements a packet buffer 96, and enables the switch core 80 to support both single-access operation and page-burst-access operation. Specifically, all valid packets are passed by the DRAM bus 94 to be DRAM 92.

The address-lookup device 86 is shown to be coupled to the DRAM bus 94, and actively to snoop the DRAM bus 94 to implement the external address matching functionality of the switch 60. Specifically, the address-lookup device 86 captures both the source address and the destination address of a packet placed on the DRAM bus 94 by the switch core 80 for the purpose of (1) generating the EAM signal 90 and (2) constructing an address-lookup table 100. In an exemplary embodiment of the present invention, the address-lookup device 86 comprises the TNETX15AE address-lookup device manufactured by Texas Instruments of Dallas, Tex. The address-lookup device 86 implements a number of state machines 98 (e.g., lookup, delete, add, find and age state machines) to manage and maintain an address-lookup table 100 in an associated external Static Random Access Memory (SRAM) 102. The address-lookup table 100 maps the source addresses (e.g., MAC addresses) of packets received at the switch 60 to ports 62/64/65 of the switch 60 on which the respective packets were received. The process of constructing the address-lookup table 100 is referred to as the "learning" of addresses by the switch 60. Once an address/port record has been created in the address-lookup table 100, the switch 60 is able to make a determination as to which port a packet having a "learned" destination address should be routed. The address-lookup device 86 is also shown to be coupled to an EEPROM 104, that stores a sequence of initialization codes 106 that allow the address-lookup device 86 to be auto-configured. In an alternative embodiment of the present invention, initialization data may be downloaded to the address-lookup device 86 from a microprocessor (not shown) coupled to the address-lookup device 86.

As mentioned above, all valid packets received at the switch 60 are passed across the DRAM bus 94. The switch core 80 may write data to the DRAM buffers 96 in a specific format, which is recognized by the address-lookup device 86 to determine the correct destination and source addresses of the packet. The address-lookup device 86 is able to detect the start of a new packet from flag byte information included in the packet transmission. For example, a row-address strobe signal (DRAS) and a column-address strobe signal (DCAS) may be utilized to identify the position of a forward pointer, a top level of a flag byte, and whether the nibble contains the start of a frame code. Data bit 35 may be de-asserted (i.e., driven low) to denote the start of a packet. On the first word transferred on the DRAM bus 94, data bits 27–24 of the line 113 may indicate an active port number, and the column-address strobe signal 111 may also be used identify the presence of destination and source address data on the DRAM bus 94. Accordingly, in one exemplary embodiment, to determine the start of a frame, the address-lookup device 86 tests data bit 35 of a forward pointer, and decodes the first flag nibble placed on the DRAM bus 94. In this case, data bit 35 should be zero, indicating a valid packets start as opposed to a link buffer transfer. Using the column-address strobe 111, the destination address and the source address of the packet are extracted for external processing by the address-lookup device 86. The address-lookup device 86 then performs a lookup cycle by accessing the address-lookup table 100, chooses an appropriate EAM code to be outputted to the EAM interface 84 of the switch core 80 and then outputs this EAM code. Further details regarding the snoop procedure are provided in the published data sheets for the TNETX3100 Ethernet switch and the TNETX15AE address-lookup device from Texas Instruments.

Turning now to the operation of the override circuitry 88, the circuitry 88 may comprise a Field Programmable Gate array (FPGA), Application Specific Integrated Circuit (ASIC), discrete digital logic components (e.g., TIL or CMOS MSI chips) or any other programmable device. Accordingly, the logic and functions embodied within the override circuitry 88 may reside in software, hardware or a combination thereof. For the purposes of the present specification, the term "machine-readable medium" shall be taken to include any memory resource, both internal and external, that is capable of storing a sequence of instructions that may be executed by the override circuitry 88, and cause the override circuitry 88 to perform the substance of the functions specified in the present specification. Accordingly, the term "machine-readable medium" shall be taken to include, but not be limited to, solid-state memories, magnetic memories, optical memories, chemical memories or carrier-wave signals.

The override circuitry 88 is shown to include port logic 108, that operates in parallel with the address-lookup device 86 to snoop the DRAM bus 94 for the purposes of identifying a port on which a packet (propagated between the switch core 80 and the DRAM 92) was received. Specifically, the override circuitry 88 is able to identify an active port number (e.g., by observing the status of data bits 27–24 of the line 113) indicating the port on which a packet was received. The override circuitry 88 further includes a register 110 that stores an EAM code. The EAM code stored in the register 110, if propagated to the EAM interface 84 of the switch core 80, would direct (or route) a packet to a designated upstream port 65 of the switch 60. The override circuitry 88 is also shown to include a MUX 112, that receives an EAM code from the address-lookup device 86 and the EAM code stored in the register 110. The MUX 112 is operated to select between these two inputs by the port logic 108, as will be described below.

Figure 5:
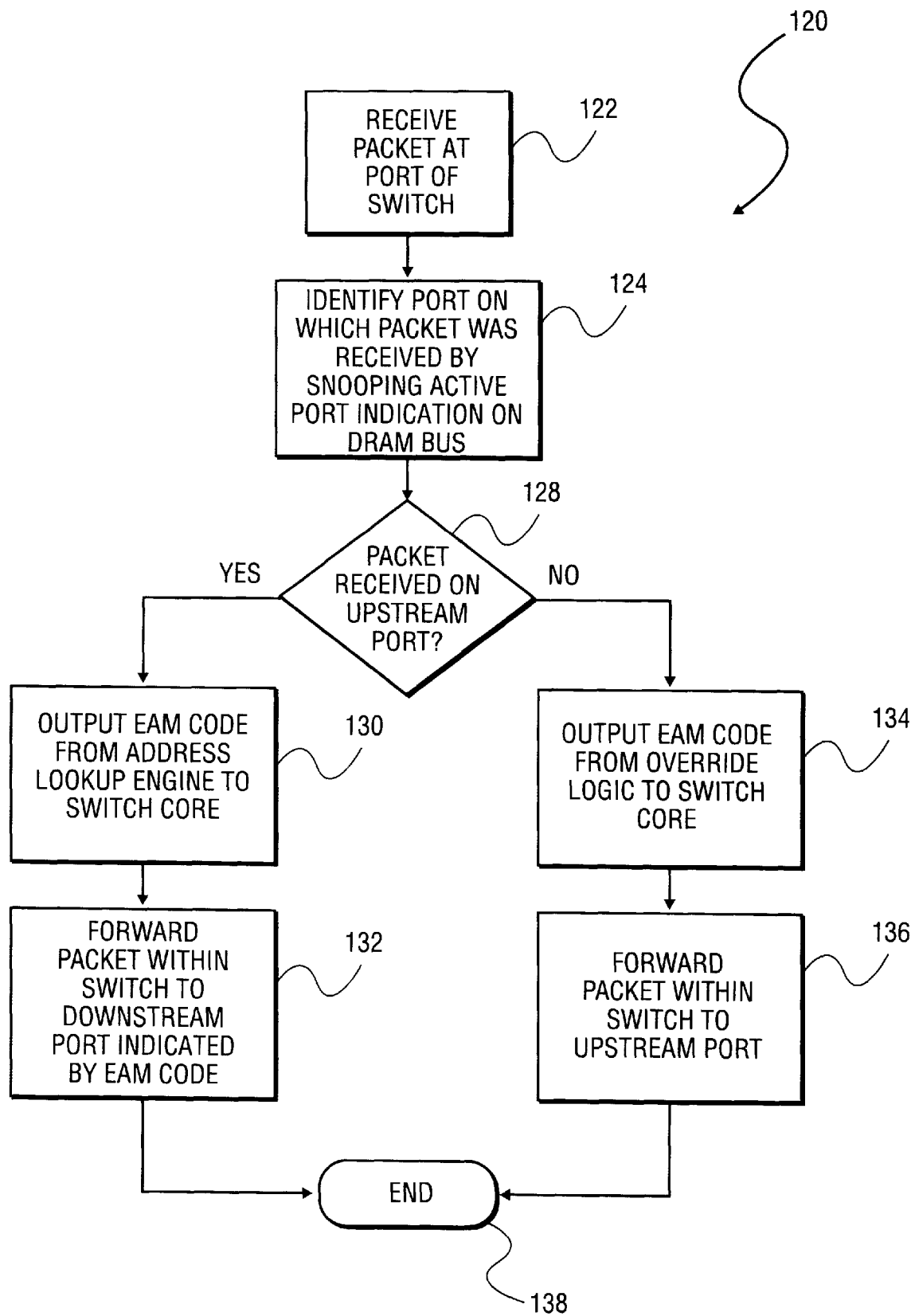
FIG. 5 is a flowchart illustrating a method, according to an exemplary embodiment of the present invention, of switching a packet within a communications network.

FIG. 5 is a flowchart illustrating a method 120, according to an exemplary embodiment of the present invention, of switching a packet within a communications network, such as that implemented over the POTS wiring 20 shown in FIG. 1. The method 120 commences at step 122, where a packet is received at a switch 60 on any one of its ports 62 or 64 or 65. The packet may comprise, merely for example, an Ethernet frame. At step 124, both the address-lookup device 86 and the override circuitry 88 snoop the DRAM bus 94 concurrently. The address-lookup device 86 snoops the bus 94 for the purpose of learning both the source and destination addresses of the received packet. The override circuitry 88 snoops the bus 94 for the purpose of determining the port of the switch on which the packet was received. More specifically, the override circuitry 88 may identify the port on which the packet was received by observing the status of data bits 27–24 of the line 113. At decision box 128, the port logic 108 makes a determination as to whether the received packet was received on the upstream (or output) port 65 or not. For example, the port logic 108 may be hard-wired to recognize a particular state for the data bits 27–24 as indicating that the received packet was recieved on the first "upstream" 65. Alternatively, the port logic 108 may include a programmable register storing a value that allows the port logic 108 to identifying a particular state for the data bits 27–24 as indicating the packet was received on a designated "upstream" port. In this case, the so-called "upstream" port need not be the port 65, and any one of the ports of the switch 60 could be designated as the "upstream" port by storing an appropriate value in the register. In a further alternative embodiment, the port logic 108 may be implemented in software, in which case the designation of the "upstream" port may comprise a value assigned to a "port number" variable. If the packet is determined to have been received from the designated "upstream" port 65, the port logic 108 operates the MUX 112 at step 130 so that the EAM code outputted by the address-lookup device 86 is propagated through to the EAM interface 84 as the EAM signal 90. At step 132, the packet is then forwarded within the switch to the downstream port, or ports, indicated by the EAM code generated by the address-lookup device 86.

On the other hand, should the port logic 108 determine at decision box 128 that the packet was not received from the "upstream" port 65 (i.e., the packet was received from any one of the "downstream" ports 62 or 64), the port logic 108 then operates the MUX 112 at step 134 to output the EAM code stored in the register 110 to the EAM interface 84 as the EAM signal 90. In this case, the port logic 108 operates to override the EAM code that will have been generated by the address-lookup device 86 with the EAM code stored in the register 110. While the EAM code is still generated by the address-lookup device 86 in this situation, it is merely ignored by the port logic 108 that controls the address-lookup device's access to the EAM interface 84. At step 136, the packet is then forwarded within the switch to the "upstream" port 65 in accordance with the EAM code propagated from the override circuitry 88. The method 120 then terminates at step 138.

The method 120 is advantageous that a packet received on any one of the downstream ports 62 or 64 will be routed to the "upstream" port 65, regardless of the determination made by the address-lookup device 86. For example, should a broadcast packet (e.g., trying to locate a DHCP server) be propagated from a device coupled to any one of the LANs 68, and received at a port 62 via any one of the PHYs 66, the broadcast packet will not be routed within the switch to any one of the other downstream ports 62 or 64, and will only be routed to the "upstream" port 65. Accordingly, the present invention provides an enhanced degree of security between the downstream ports 62 and 64 of the switch 60.

Figure 6:
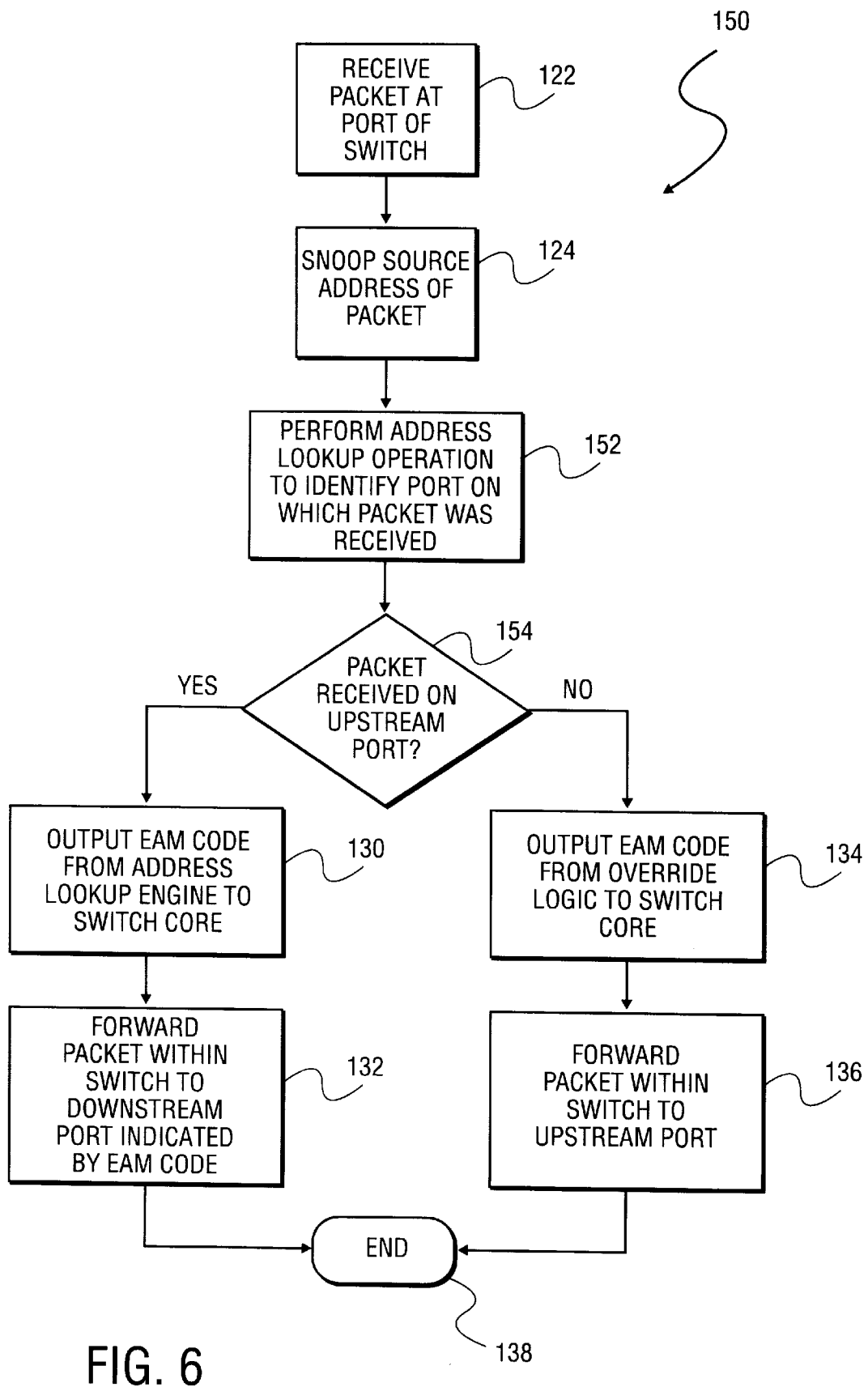
FIG. 6 is a flowchart illustrating a method, according to an alternative exemplary embodiment of the present invention, of switching a packet within a communications network.

FIG. 6 is a flowchart illustrating an alternative method 150, according to an exemplary embodiment of the present invention, of switching a packet within a communications network. The method 150 is similar to the method 120 described above with reference to FIG. 6. However, in this embodiment, the port logic 108 is provided with a higher degree of functionality so as to enable it to function within an environment in which an active port indication may not be placed on the DRAM bus 94. Specifically, at step 152, the port logic 108 may snoop the DRAM bus 94 concurrently and parallel with the address-lookup device 86, for the purpose of determining the source address of the received packet. At step 154, the port logic 108 then performs an address lookup operation, utilizing the address-lookup table 100 stored in the SRAM 102, to determine the port on which the packet was received. Accordingly, for the alternative method 150, the port indication is determined by the port logic 108 by performing an independent address-lookup operation.

In yet further embodiments of the present invention, the port logic 108 may receive a signal from the address-lookup device 86 indicating the port on which the packet was received, or may snoop a bus coupling the address-lookup device 86 to the SRAM 102 for the purpose of identifying a port on which the packet was received.

Accordingly, a method and apparatus for the secure switching of a packet within a communications network have been described. Although the present invention has been described with reference to specific exemplary embodiments, it will be evident that various modifications and changes may be made to these embodiments without departing from the broader scope and spirit of the invention. Accordingly, the specification and drawings are to be regarded in an illustrative rather than restrictive sense.

What is claimed is:

1. Switching apparatus for switching a packet within a communications network, the switching apparatus comprising:

a switching core servicing a plurality of ports;

address matching logic, coupled to the switching core, to implement an address look-up scheme according to which the switching core switches a packet; and override logic, coupled to the switching core, to determine whether a packet, received at any one of the plurality of ports serviced by the switching core, was received at a first port and, if not, to override the address matching logic to cause the switching core to route the packet exclusively to the first port.

2. The switching apparatus of claim 1 wherein the override logic snoops a bus on which an indication of an active port is provided to determine whether the packet was received at the first port.

3. The switching apparatus of claim 1 wherein the override logic receives an indication from the address matching logic as to whether the packet was received at the first port.

4. The switching apparatus of claim 1 wherein the override logic performs an address matching operation in parallel with an address matching operation performed by the address matching logic to determine whether the packet was received at the first port.

5. The switching apparatus of claim 4 wherein the override logic determines whether or not a source address of the packet received corresponds to a network address associated with any one of the plurality of ports serviced by the switching core other than the first port.

6. The switching apparatus of claim 5 wherein the override logic accesses a memory resource storing network address and port association information maintained by the address matching logic.

7. The switching apparatus of claim 1 wherein the address matching logic is external to the switching core.

8. The switching apparatus of claim 7 wherein the address matching logic propagates a port-indicating signal to an external address matching interface of the switching core, and wherein the override logic disables propagation of the port-indicating signal from the address matching logic to the external address matching interface of the switching core.

9. The switching apparatus of claim 8 wherein the override logic propagates an override port-indicating signal to the external address matching interface of the switching core, the override port-indicating signal indicating the first port as an exit port of the switching core from which the packet is to be propagated over the communications network.

10. The switching apparatus of claim 9 wherein the override logic performs a multiplexing operation between the port-indicating signal propagated from the address matching logic and the override port-indicating signal according to whether the packet was received at the first port.

11. Switching apparatus for switching a packet within a communications network, the switching apparatus comprising:

a switching core servicing a plurality of ports; and switching logic, coupled to the switching core, to determine whether a packet received at any one of the plurality of ports serviced by the switching core was received at a first port and:

if so, to route the packet according to a default switching scheme within the switch; and if not, to route the packet to the port service by the switch.

12. The switching apparatus of claim 11 wherein the switching logic comprises address matching logic to implement the default switching scheme, and override logic to route the packet to the first port.

13. The switching apparatus of claim 12 wherein the override logic snoops a bus on which an indication of an active port is provided to determine whether the packet was received at the first port.

14. The switching apparatus of claim 12 wherein the override logic receives an indication from the address matching logic as to whether the packet was received at the first port.

15. The switching apparatus of claim 12 wherein the override logic performs an address matching operation in parallel with the default switching scheme performed by the address matching logic to determine whether the packet was received at the first port.

16. The switching apparatus of claim 15 wherein the override logic accesses address look-up information maintained by the address matching logic to determine whether the packet was received at the first port.

17. The switching apparatus of claim 15 wherein the override logic determines whether or not a source address of the packet received corresponds to a network address associated with any one of the plurality of ports of the switching core other than the first port.

18. The switching apparatus of claim 11 wherein the switching logic is external to the switching core, and propagates a port-indicating signal to the switching core indicating one of the plurality of ports of the switching core as being an exit port for the packet.

19. The switching apparatus of claim 18 wherein the switching logic performs a multiplexing operation between a first port-indicating signal generated according to the default switching scheme and a second port-indicating signal designating the first port as the exit port for the packet.

20. The switching apparatus of claim 11 wherein the default switching scheme comprises an external address look-up operation utilizing an address look-up table stored in a memory resource.

21. The switching logic for switching a packet within a communications network, the switching logic comprising:
  determination logic to determine whether a packet received at any one of a plurality of ports of a switch was received at a designated upstream port of the switch; and
  signal generation logic to output a port-indicating signal to indicate the designated upstream port as an exit port of the switch for the packet if the packet was received on any one of the plurality of ports of the switch other than the upstream port.

22. The switching logic of claim 21 wherein the determination logic snoops a bus on which an indication of an active port is provided to determine whether the packet was received at the designated upstream port.

23. The switching logic of claim 21 wherein the determination logic receives an indication from address matching logic as to whether the packet was received at the designated upstream port.

24. The switching logic of claim 21 wherein the determination logic performs an address matching operation in parallel with address matching logic of the switch to determine whether the packet was received at the designated upstream port or not.

25. The switching logic of claim 24 wherein the determination logic accesses address look-up information maintained by the address matching logic to determine whether the packet was received at the designated upstream port or not.

26. The switching logic of claim 24 wherein the determination logic determines whether or not a source address of the packet corresponds to a network address associated with any one of the plurality of ports of the switch other than the designated upstream port.

27. The switching logic of claim 21 wherein the signal generation logic outputs the port-indicating signal to a switching core of the switch.

28. The switching logic of claim 27 wherein the signal generation logic performs a multiplexing operation between a default port-indicating signal generated by address matching logic and the port-indicating signal outputted by the signal generation logic, the selected output of the multiplexing operation being propagated to the switching core of the switch.

29. Switching apparatus for switching a packet within a communications network, the switching apparatus comprising:
  switch core means, servicing a plurality of ports, one of the plurality of ports comprising an upstream port, for switching packets between the plurality of ports; and
  determination means, coupled to the switching core, for determining whether a packet received at any one of the plurality of ports of the switching core was received at the upstream port and:
    if so, for routing the packet according to a default switching scheme within the switch; and
    if not, for routing the packet to the upstream port within the switch.

30. A method of switching a packet through a multi-port switch having a plurality of ports, the method including the steps of:
  determining whether a packet is received at a first port of the multi-port switch;
  if so, routing the packet according to a default switching scheme within the switch; and
  if not, then overriding the default switching scheme to route the packet to the first port for propagation over a communications network.

31. The method of claim 30 wherein the step of determining comprises snooping a bus on which an indication of an active port is provided to determine whether the packet was received at the first port.

32. The method of claim 30 wherein the step of determining comprises generating an indication from the address matching logic as to whether the packet was received at the first port.

33. The method of claim 30 wherein the step of determining comprises determining whether or not a source address of the packet corresponds to a network address associated with any one of the plurality of ports of the switch other than the first port.

34. The method of claim 33 including the step of determining that the packet was not received from the first port if the source address corresponds to a network address associated with any one of the plurality of ports of the switch other than the first port.

35. The method of claim 33 including the step of determining that the packet was received from the first port if the source address does not correspond to a network address associated with any one of the plurality of ports of the switch other than the first port.

36. The method of claim 30 wherein the default switching scheme comprises an address matching scheme.

37. The method of claim 36 wherein the address matching scheme is an external address matching scheme implemented by external address matching logic.

38. The method of claim 37 wherein the step of overriding the default switching scheme includes the step of disabling propagation of a port-indicating signal from the external address matching logic to an external address match interface of a switch fabric.

39. The method of claim 38 wherein the step of overriding includes the step of propagating an alternative port-indicating signal from override logic to the external address matching interface of the switch fabric.

40. The method of claim 39 wherein the step of overriding includes the step of performing a multiplexing operation with respect to the port-indicating signal from the external address matching logic and the alternative port-indicating signal.

41. The method of claim 33 wherein the step of determining whether or not a source address of the packet corresponds to a network address associated with any one of the plurality of ports of the switch other than the first port includes the step of accessing address-lookup information maintained by external address matching logic.

42. A machine-readable medium storing a sequence of instructions that, when executed by a machine, cause the machine to perform the steps of:

determining whether a packet is received at a first port of a switch servicing a plurality of ports;

if so, then switching the packet according to a default switching scheme; and if not, then overriding the default switching scheme to route the packet to the first port for propagation over a communications network.

\* \* \* \* \*